(12) United States Patent
Herrmann et al.

(10) Patent No.: US 6,895,823 B1
(45) Date of Patent: May 24, 2005

(54) DEVICE FOR MEASURING THE FLOW RATE AND/OR THE FLOW THROUGHPUT OF A FLUID

(75) Inventors: Volker Herrmann, Klipphausen (DE); Guenther Pfeifer, Dresden (DE)

(73) Assignee: Sick Engineering GmbH, Ottendorf-Okrilla (DE)

( * ) Notice: Subject to any disclaimer, the term of this patent is extended or adjusted under 35 U.S.C. 154(b) by 0 days.

(21) Appl. No.: 10/612,830

(22) Filed: Jun. 30, 2003

(30) Foreign Application Priority Data

Jul. 4, 2002 (DE) ................................ 102 29 925

(51) Int. Cl.⁷ ................................................ G01F 1/32
(52) U.S. Cl. ................................................ 73/861.23
(58) Field of Search ................ 73/861.23, 861.22, 73/861.27, 861.29, 861.28

(56) References Cited

U.S. PATENT DOCUMENTS

| | | |
|---|---|---|
| 4,103,551 A | 8/1978 | Lynnworth |
| RE29,785 E * | 9/1978 | Leschek et al. ............. 310/327 |
| 4,380,934 A * | 4/1983 | Okuda et al. ............ 73/861.23 |
| 4,763,513 A | 8/1988 | Zacharias |

FOREIGN PATENT DOCUMENTS

| | | |
|---|---|---|
| DE | 4439399 A1 | 5/1996 |
| DE | 19861074 A1 | 12/1999 |
| DE | 10040344 A1 | 2/2002 |
| DE | 10051534 A1 | 4/2002 |
| JP | 2000337940 A | 12/2000 |
| JP | 2001133304 A | 5/2001 |

* cited by examiner

Primary Examiner—Edward Lefkowitz
Assistant Examiner—Jewel V. Thompson
(74) Attorney, Agent, or Firm—Townsend and Townsend and Crew LLP

(57) ABSTRACT

A device for measuring the flow velocity and/or the throughput of a fluid by means of ultrasound, with at least one ultrasonic transducer (16, 18) arranged on the outside of a wall (14) of a pipeline (12) and in contact with the wall (14). In order to provide an improved measurement device, with which the maintenance expense can be reduced and which has a greater measurement accuracy, a portion (32) of the wall forms a part (30) of the ultrasonic transducer.

10 Claims, 6 Drawing Sheets

DEVICE FOR MEASURING THE FLOW RATE AND/OR THE FLOW THROUGHPUT OF A FLUID

The invention concerns a device for measuring the flow velocity and/or the throughput of a fluid according to the preamble of claim 1.

The measurement principle of such an ultrasound flow meter detects a difference in the travel time of two ultrasound signals, which have one component in the flow direction and another component opposite the flow direction. There are two known techniques for constructing the flow meters that employ the travel time principle.

According to one technique, the ultrasonic transducers generating the ultrasound signals are attached to a pipe or pipe wall with adapter flanges 2a and 3a as shown in FIG. 4a. The adapter flanges are either welded into or are an integral part of a counter body when the latter is made by casting. Since the ultrasonic transducers 4a and 5a are installed at a particular angle (usually 45°), a cavity 6a is always created, which disturbs the flow. This takes place regardless of whether the transducer is inserted midway (FIG. 6a), is retracted (FIG. 6b), or extends into the flow. The resulting eddies cannot be entirely analytically calculated and are dependent on flow disturbances and the flow velocity (Reynold's number) that might be present upstream from the flow meter. The resulting errors are determined with calibrations and stored as a usually nonlinear correction function. Since only one particular range of Reynold's numbers and one specific installation situation can be provided for during the calibration, residual errors occur when these conditions vary, which is almost always the case. Moreover, deposits can accumulate in the resulting cavity, which can influence the measurement accuracy. Furthermore, when installed midway or extending into the flow, the pipe does not have free clearance and pipe scrapers, for example, cannot be used.

From WO 00/43736 an ultrasound flow counter is known, in which the ultrasonic transducers 4b and 5b are clamped to the outside of a pipeline 1b, as shown in FIG. 4b. This so-called clamp-on technique attempts to reduce the aforesaid drawbacks. A further purpose of the clamp-on technique is to enable a flow measurement without modifying the existing pipeline, i.e. without welding or otherwise interfering with the pipe. The clamp-on technique is especially suitable for temporary measurements. With the clamp-on technique, there is no disturbance of the pipeline 1b and thus of the flow. However, it has the following disadvantage: only little sonic energy can be coupled in, because of the massive pipeline. This leads to a reduced signal/noise separation and thus an increased likelihood of encountering interference. A special coupling medium such as silicone grease is required, which ages over time and thus can lead to changes in the read values, or even a loss of measurements, which represents maintenance problems. The pipe thickness cannot be determined with the required precision from the outside. There is no way of determining the surface roughness of the pipe, which also influences the measurement accuracy. Fluctuations in the pipe thickness result in travel time differences and, thus, loss of accuracy. Furthermore, the measurement path length and the angle cannot be determined with the precision of the earlier mentioned technique using welded-on adapter flanges or transducer receptacles that are an integral part of the housing. The clamp-on flow meter must be adjusted, parameterized and set up on site. This lowers the accuracy. Furthermore, personnel with very high qualifications are required for the set-up. Since the radiating surface cannot be precisely defined and the energy input is too low, the only attainable measurement pathways are along the pipe diameter. This means that measurements cannot be performed along off-center pathways. With the clamp-on technique, only measurements involving certain media can be performed and gases require minimum pressures.

In the product description of the company named "Controlotron Clamp-on-Spool System 1010", an effort is made to lessen the drawbacks of the on-site adjustment and set-up. For this, a device of the clamp-on technology is strapped onto a piece of pipe and pre-adjusted at the factory. The pipe thickness can be accurately determined, but a precise, small, machined dimension is not present. Thus, the associated disadvantages of minimum pressures and poor signal coupling are not eliminated. With the exception of the adjustment, the previously mentioned drawbacks of the clamp-on technique are remedied. Furthermore, the adjustment problem occurs after each maintenance and change of transducer, because the transducers are not an integral part of the measurement pipe, but only mounted on it.

From JP 2000337940 A it is known how to arrange the piezocrystal which generates the ultrasound waves directly on the bottom of a recess in the wall of a pipe. Although the wall thickness can be more precisely determined, the other, earlier mentioned disadvantages are still present. In the final analysis, this is a clamp-on technique, but one in which the piezocrystal is arranged directly on the wall. A simple binding of the piezocrystal to the wall does not lead to an acceptable energy coupling. The measurement precision is not improved, and the ultrasound is also conducted through the wall in a rather uncontrolled fashion. The wall itself has no additional function for the ultrasonic transmitter.

Based on this state of the art, it is an object of the invention to provide an improved measurement device which avoids these drawbacks, which involves less maintenance cost, and which affords a greater measurement accuracy. The invention proposes to preserve the accuracy of the flow meters with transducers that extend or dip into the flow, making it possible to completely configure and pre-adjust them at the plant, while avoiding the drawbacks caused by cavities.

This object is attained with a device having the features of claim 1.

According to the invention, the device for measuring the flow velocity and/or the volumetric throughput of a fluid has at least two elements which respectively produce and register the ultrasound and which can be applied to the outside of a wall of a fluid pipeline forming a counter housing, as is generally known from the clamp-on technique. According to the invention, and unlike the state of the art, a portion of the wall forms an ultrasound emitting or capturing membrane of an ultrasonic transducer, wherein the wall portion is dimensioned to fit the ultrasonic transducer.

In contrast to the clamp-on technique, according to the invention the ultrasonic transducer is not simply placed on the massive wall, but instead it is at least partly integrated into the wall. Due to the fact that the piezocrystals are not simply bonded or strapped onto the wall, but use the elements of conventional separate transducers, with the membrane being formed by a partial wall region, the properties of the ultrasonic transducer can be controlled in familiar fashion so that the desired accuracy can be attained. A particular advantage of the invention thus lies in combining the advantages of the clamp-on technique (not extending into the flow in the measurement pipe) and the precision afforded by separate transducers that are flanged onto openings of the measurement pipes. The partial wall region required to integrate the ultrasonic transducer into the wall can be precision machined. The result is a complete flow meter which integrates the membrane of the transducer into the pipe wall. The measurement device can be set up and calibrated entirely at the plant, so that this work need not be done at the site. Contrary to the clamp-on technique, the flow meter is interchangeable in its outer dimensions and handling, when compared to conventional ultrasound flow meters or turbine wheel meters.

Since the partial wall region forming a part of the ultrasonic transducer is manufactured with an accurate wall thickness and the pipe has a known surface roughness, their influence on the transmission of the sound is very precisely defined. In this way, it is possible to eliminate the travel time differences and the associated losses of accuracy caused by tolerances in wall thickness, such as occur when using the clamp-on technique.

The invention can be used for the measurement of the diverse media and, in the case of gases, for the measurement with the diverse gas pressures, even at ambient pressure, and large pipe diameters.

Customarily used ultrasonic transducers, such as are known, for example, from DE 100 40 344 A1, have a sound-emitting membrane with a waveguide, a piezoceramic, an opposing oscillator and a spring, which prestresses the piezoceramic between the opposing oscillator and the waveguide. The membrane and waveguide are conventionally made of a single piece.

In contrast, according to the invention the membrane of the transducer is part of the wall of the pipeline and, thus, of the measurement pickup, and this membrane can be machined. The membrane is preferably dimensioned such that it is thin and the oscillating surface is very small. The inner contour of the pipe remains unchanged.

The membrane can be accurately adapted to the ultrasonic transducer, so that the properties of the ultrasonic transducer can be influenced. In this manner, the radiation emitting characteristics can be optimized.

In an advantageous embodiment of the invention, the ultrasonic transducer is of the lengthwise oscillator type and a waveguide is arranged between the element producing and the one receiving the ultrasound, i.e. the piezocrystal and the membrane. This has the advantage that the waveguide and the wall portion forming the membrane can be exactly configured, so that the ultrasound energy is optimally transmitted to the membrane and, as a result, an optimal ultrasound radiation is achieved.

For an optimal transmission of the sound energy from the piezocrystal to the membrane via the waveguide, the contact region between ultrasonic transducer and wall is form-fitted, for example with a simple, spherical shape. This produces an advantageous spherical radiation characteristic.

Since the wall forming the membrane can be made thin, the sonic energy is coupled into a less massive pipeline, so that more sonic energy can be coupled in, resulting in an improved signal/noise ratio and thus less vulnerability to interference.

If the membrane has a small dimension relative to the wavelength of the ultrasound, one can produce the largest possible angle of radiation, so that an oppositely arranged transducer slightly upstream or downstream still lies in the cone of radiation of the transducer, even though the direction of radiation is perpendicular to the pipe axis. This substantially improves the layout of the flow meter, since a perpendicular mounting of the transducer can be achieved much more accurately than mounting it at a different angle. This assures a high accuracy that is comparable to the accuracy of devices with transducers that extend into the flow.

An effective protection of the transducer is provided by a cover which protects the ultrasonic transducer set into the pipe wall from its surroundings. The outer structural dimensions of the counter are reduced. Furthermore, such a protection also prevents an age deterioration of a contact medium between the wall portion forming the membrane and the waveguide of the transducer.

As a further modification of the invention, a spring element can be pressed against the wall portion forming the membrane. The spring element is advantageously propped against the cover.

Although the transducers of the invention emit in the direction of the diameter on account of the perpendicular mounting, off-center measurement pathways are nevertheless covered since the transducers generate a radiation cone with large opening. In addition, more measurement pathways can be covered with a large radiation cone, since several receivers can be assigned to each transmitter. Thus, the number of measurement pathways can be larger than the number of ultrasonic transducers divided by two.

The invention will now be explained in detail by means of a sample embodiment making reference to the drawings, which show:

Figure 5A:
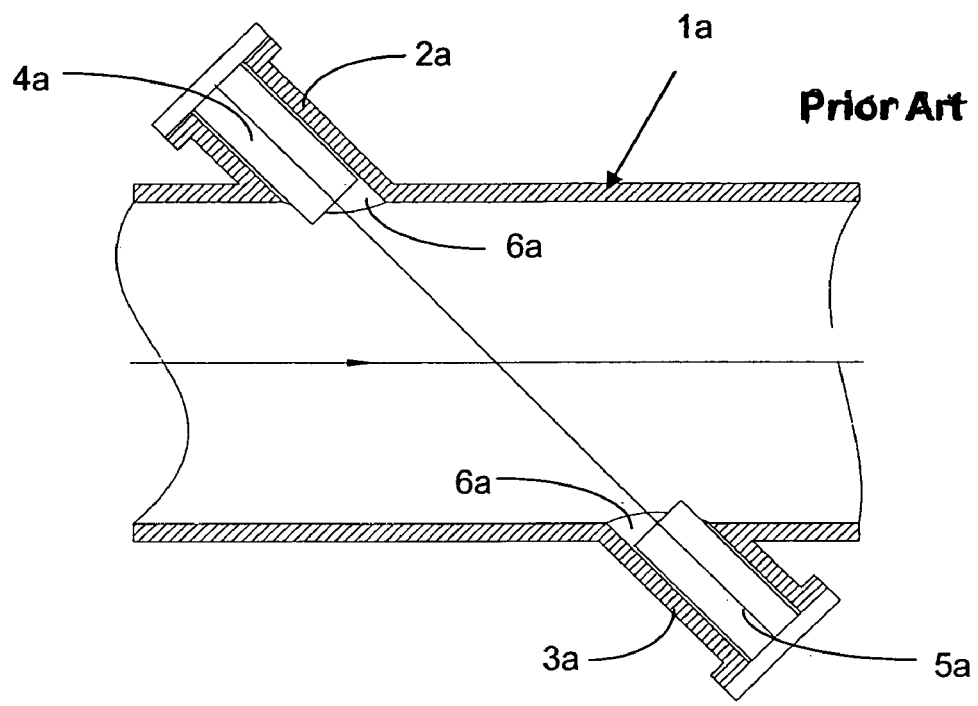
Figure 5B:
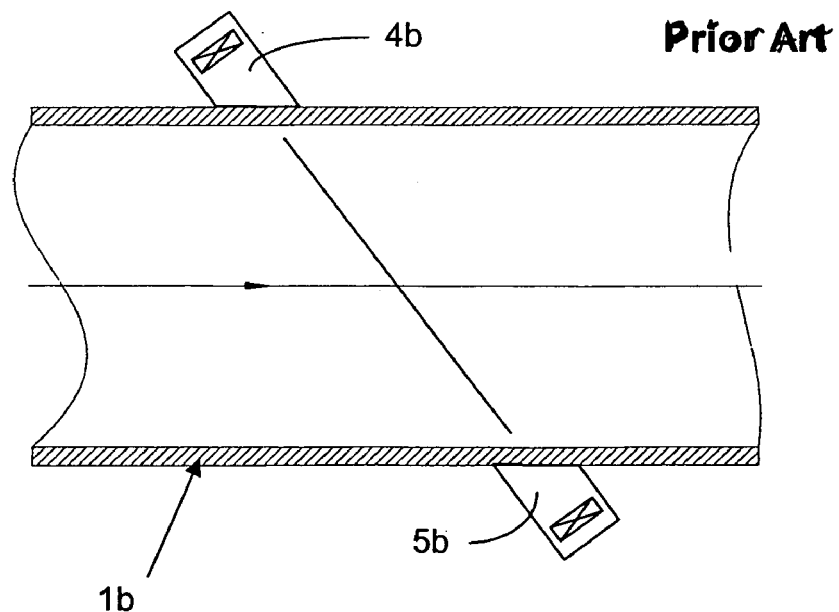

FIGS. 5a, b show devices made according to the prior art; and

Figure 6A:
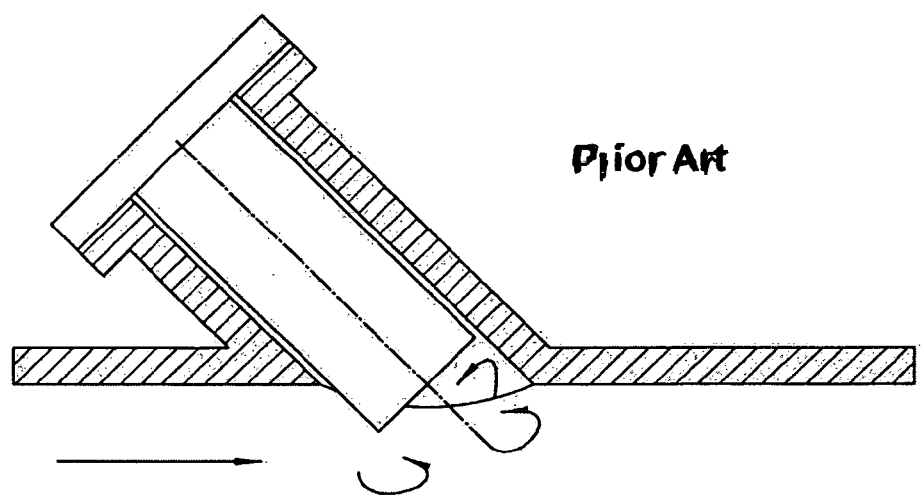
Figure 6B:
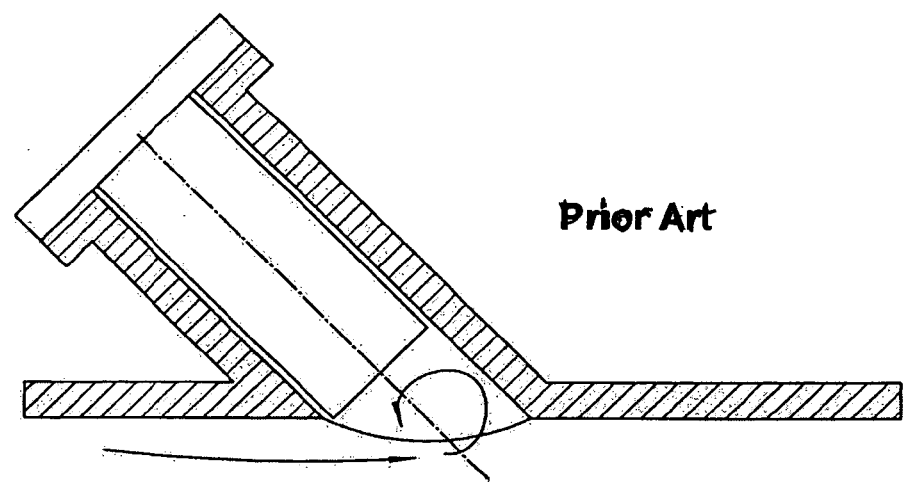

FIGS. 6a, b show transducer arrangements according to the prior art, midway (FIG. 6a) and retracted (FIG. 6b).

Figure 1:
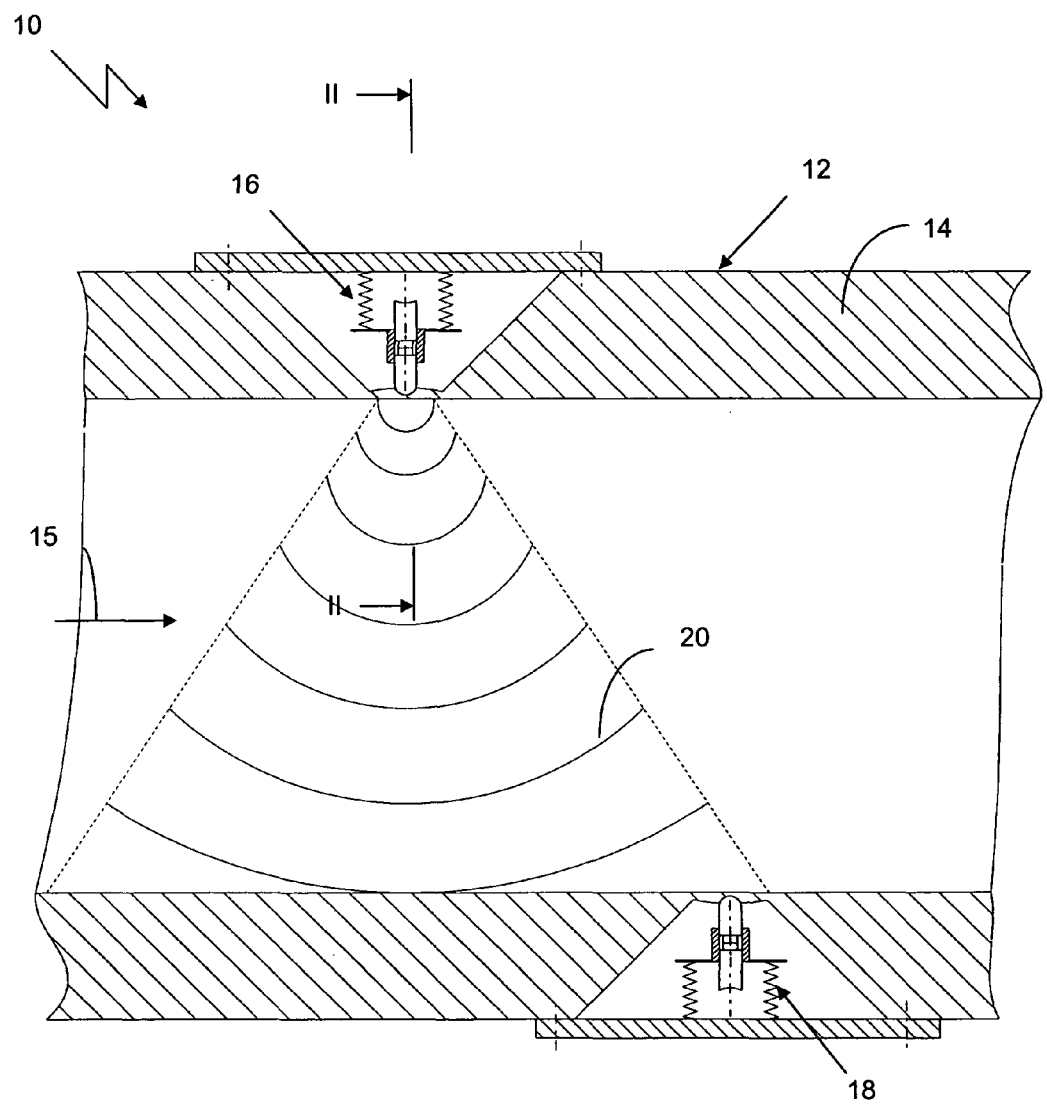
FIG. 1 is a longitudinal cross-section of a device constructed in accordance with the invention.

A device 10 (FIG. 1) made in accordance with the invention for measuring the flow velocity and/or the throughflow of a fluid by means of ultrasound comprises a pipeline 12 for a fluid flowing in the direction of the arrow 15, which can be a gas or a liquid. In a wall 14 of pipe 12 two ultrasonic transducers 16 and 18 are arranged so that one lies in the radiation cone of the other, and one transducer 18 is arranged downstream from the first transducer 16. Ultrasound signals of transducer 16, which are represented for example by wave fronts 20, and which are picked up by transducer 18, have a component that propagates in the flow direction. Ultrasound signals which are emitted by the transducer 18 towards the transducer 16, and which are picked up by transducer 16, have an equally large component in the opposite flow direction 15, so that one can measure differences in travel time caused by the fluid flow 15.

The invented arrangement and layout of the ultrasonic transducers 16 and 18 will be discussed below with reference to FIG. 2, which shows the device 10 in greater detail, while the layout will only be discussed in terms of one transducer 16. Of course, additional transducers, such as the transducer 18 shown in FIG. 1, can be constructed and arranged in similar manner according to the invention.

Ultrasonic transducer 16 has, as is known, a piezoceramic 22 generating the ultrasound. It is arranged between an oscillator 24 and an opposing waveguide 26 and is prestressed by a spring 28 between the oscillator 24 and the waveguide 26. The waveguide 26 at its end opposite the piezoceramic 22 is in contact with a membrane 30, which emits the ultrasound waves generated by the piezoceramic 22.

According to the invention, the membrane 30 is part of the wall 14, and a portion 32 of the wall 14 forming the membrane 30 has a much smaller wall thickness d than the rest of the wall 14.

Figure 2A:
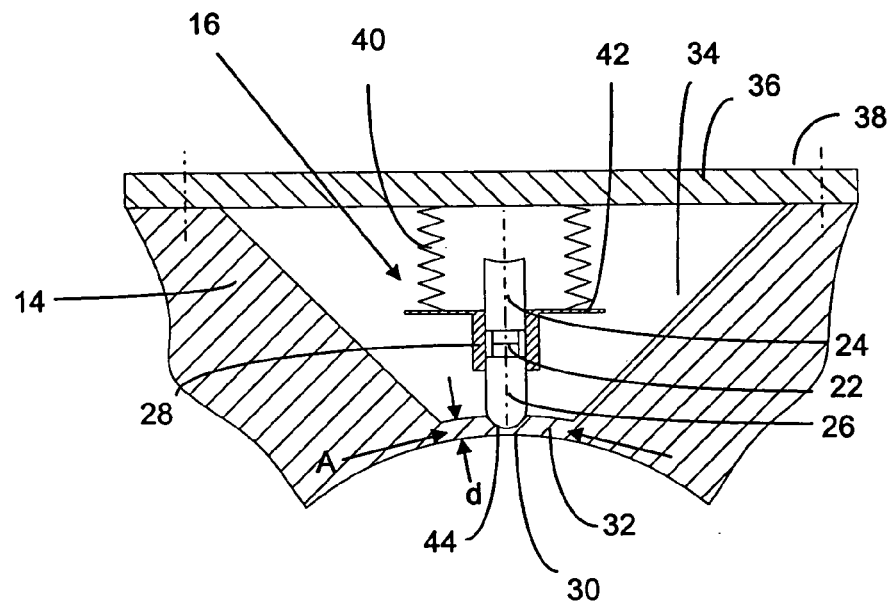
FIG. 2a is a cross-section taken along line II—II of FIG. 1.
Figure 3A:
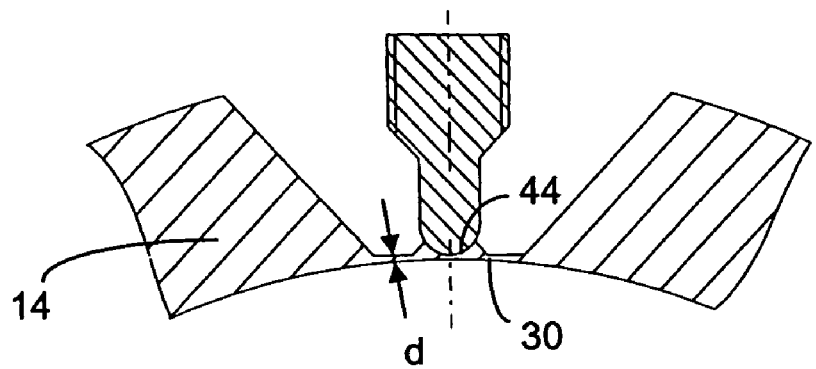
FIG. 3a is a partial view of FIG. 2.

The contact site or area 44 between waveguide 26 and membrane 30 is form-fitted and preferably spherical, as is shown in FIGS. 2a and 3a. A coupling medium such as a silicone grease is provided, so that ultrasound energy is optimally coupled into membrane 30. Because of the relatively small dimension A of membrane 30, the size of the sound-emitting surface, namely the size of the membrane 30, is limited and can be relatively small.

Figure 2B:
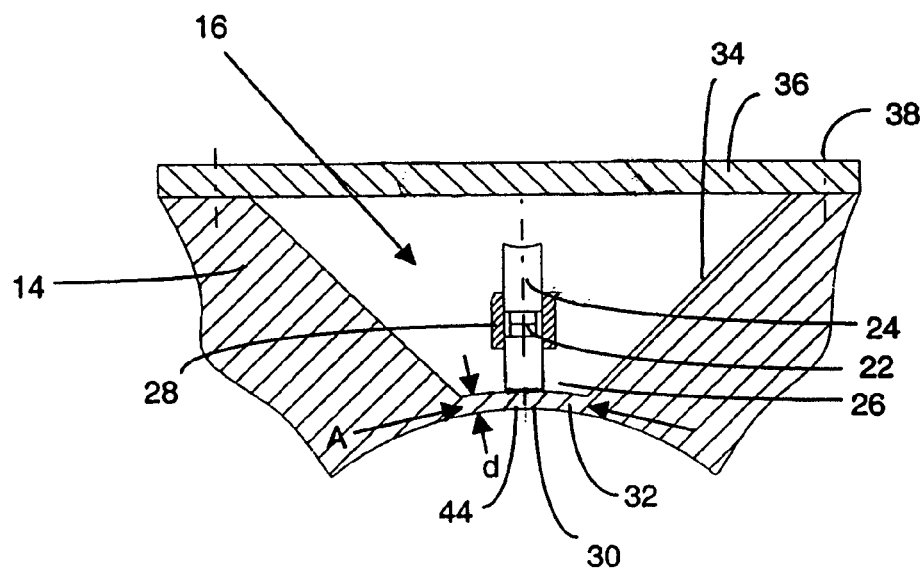
FIG. 2b is a view similar to FIG. 2 and shows another embodiment.
Figure 3B:
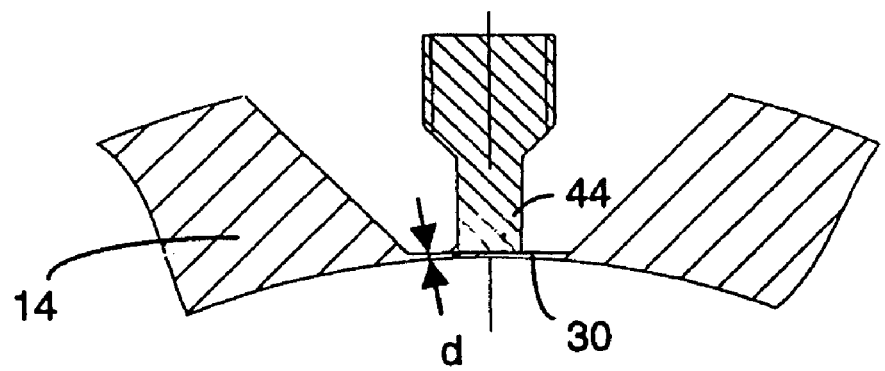
FIG. 3b is a partial view similar to FIG. 2 of another embodiment.

Another configuration for coupling waveguide 26 is shown in FIGS. 2b and 3b. Here, the waveguide 26 is firmly connected to the membrane 30, e.g. by welding or soldering, in order to achieve a more intense mechanical coupling. The other transducer parts 22, 24, 28 are then screwed onto the thread of the waveguide 26 and thus yield a complete ultrasonic transducer. A support by spring 40, 42 is no longer necessary, since the waveguide is firmly connected to the membrane.

FIGS. 3a and b show different configurations for the membrane 30. Its thickness d is even further reduced here as compared to FIGS. 2a and b, while the coupling area between waveguide 26 and membrane 30 is again spherical.

The membrane 30, which is both part of the transducer 16 and part of pipe wall 14, is made by machining wall 14.

The transducer 16 is placed into a recess 34, with the membrane 30 forming the bottom of the recess. A cover element 36 covers recess 34 with the transducer 16 if the recess 34 is large enough so that it can fully accommodate the transducer 16. The cover 36 can be secured to the wall 14 by suitable fasteners 38. The transducer 16 with its waveguide 26 is biased against membrane 30 by a spring element 40 that is propped against cover 36. The ultrasonic transducer must be tuned to the encountered installation to optimize the radiation of sonic energy and absorb as little sonic energy as possible in cover 36 and wall 14.

A spring supporting and holding element 42, which connects transducer 16 to cover 36 by means of spring 40, is preferably arranged at an oscillation node of ultrasonic transducer 16, which reduces the transmission of ultrasonic oscillations to cover 36. Furthermore, the spring element 40 can be fashioned as a sound filtration structure, for example, by way of its geometrical shape, in order to reduce the transmission of residual oscillations of the contact area 44 of the transducer 16 to the cover 36 and thus to the massive part of the pipeline 12.

Figure 4:
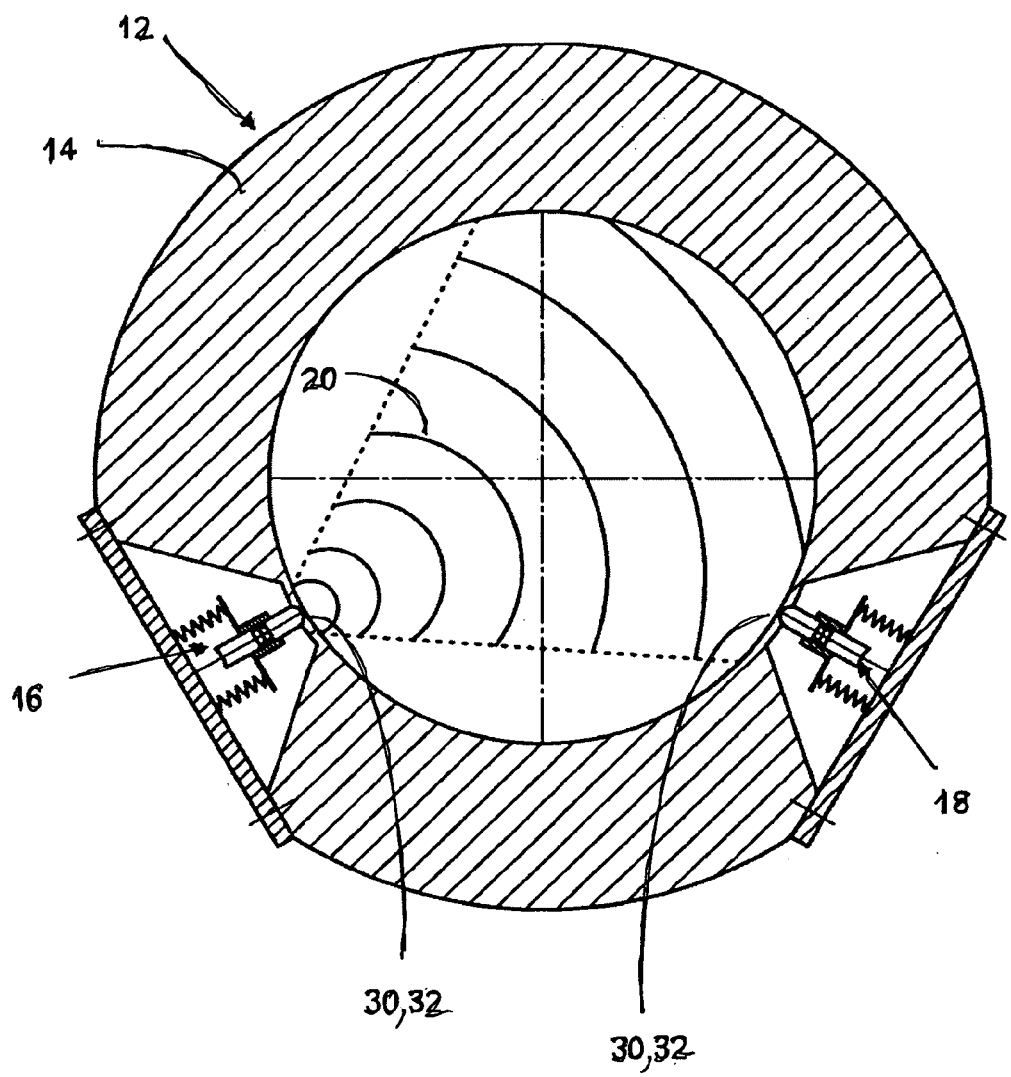
FIG. 4 shows path orientations other than along the diameter.

In contrast with other technologies, the transducers can also be used in a path position outside the pipe diameter, thanks to the thin membrane (FIG. 4). This means that measurements can also be taken along off-center pathways. Although the invented transducers emit radiation in the direction of the diameter by virtue of their perpendicular mounting, they can nevertheless be used with off-center measurement pathways, since the transducers generate a radiation cone with large aperture, especially when the membrane is small and thin. In addition, more measurement pathways can be arranged with a large radiation cone, since several receivers can be assigned to each transmitter. Thus, the number of measurement pathways can be larger than the number of ultrasonic transmitters divided by two.

What is claimed is:

1. A device for measuring at least one of the flow velocity and the volumetric throughput of a fluid by means of ultrasound, the device comprising at least two ultrasound producing or ultrasound receiving elements arranged on an outside of a wall of a fluid pipeline forming a measurement housing, wherein a portion of the wall forms an ultrasound emitting or receiving membrane of an ultrasonic transducer, and the portion of the wall forming the membrane is dimensionally adapted to the ultrasonic transducer.

2. A device according to claim 1, wherein the ultrasonic transducer is of a lengthwise oscillating type and a waveguide is arranged between the ultrasound producing or receiving element and the membrane.

3. A device according to claim 2, wherein a contact region between the waveguide and the portion of the wall has a form-fitting configuration.

4. A device according to claim 3, wherein the contact region between the waveguide and the portion of the wall has a spherical shape.

5. A device according to claim 1, wherein the portion of the wall is thinner than the remainder of the wall.

6. A device according to claim 1, wherein the ultrasonic transducer extends at least partly into the wall.

7. A device according to claim 1, wherein a cover covers the ultrasonic transducer extending into the wall.

8. A device according to claim 1, further comprising a spring biasing the ultrasonic transducer against the portion of the wall forming the membrane.

9. A device according to claim 1, wherein the spring is propped against the cover.

10. A device according to claim 1, wherein the ultrasonic transducer is arranged so that a measurement pathway lies outside a diameter of the pipe.

* * * * *